United States Patent [19]
Richards

[11] Patent Number: 5,732,110
[45] Date of Patent: Mar. 24, 1998

[54] RECEIVER HAVING AN ADJUSTABLE SYMBOL SLICE DEMODULATOR

[75] Inventor: Anthony H. Richards, Cambridge, United Kingdom

[73] Assignee: U.S. Philips Corporation, New York, N.Y.

[21] Appl. No.: 533,029

[22] Filed: Sep. 25, 1995

[30] Foreign Application Priority Data

Sep. 29, 1994 [GB] United Kingdom ............... 9419630

[51] Int. Cl.$^6$ .................................................. H03D 1/00
[52] U.S. Cl. .................................................. 375/334
[58] Field of Search ......................... 375/317, 272, 375/278, 287, 324, 326, 334; 329/302, 323

[56] References Cited

U.S. PATENT DOCUMENTS 3,947,769  3/1976  Nicholas et al. ............. 325/320
4,574,247  3/1986  Jacob ......................... 375/334 X

FOREIGN PATENT DOCUMENTS

0012730 A1  6/1980  European Pat. Off.

*Primary Examiner*—Stephen Chin
*Assistant Examiner*—Kevin Kim
*Attorney, Agent, or Firm*—Arthur G. Schaier

[57] ABSTRACT

An FSK zero IF receiver has means (DEM) for producing representations of demodulated modulating signals as a series of narrow pulses having a repetition rate greater than the symbol rate of the modulating signals and an adjustable symbol slice demodulator (54 to 66) for determining the data. The demodulator has means for adjusting a symbol slice threshold value in dependence of the pulse like representations of the deviation frequencies which may be different as a result of drifting between the local oscillator and nominal transmitter carrier frequencies ($f_L$ and $f_C$). The means for adjusting the symbol slice threshold comprises means for measuring the peak excursions of the instantaneous representations of the frequency, the difference between the peak excursions being proportional to the transmitted deviations, means for calculating the mean deviation of the peak excursions, which mean deviation is proportional to the offset between the transmitted center frequency and the local oscillator frequency, and means for setting the symbol slice level to the mean deviation in the case of a 2 level signal or to a plurality of symbol slice levels in the case of a M-ary signal.

15 Claims, 6 Drawing Sheets

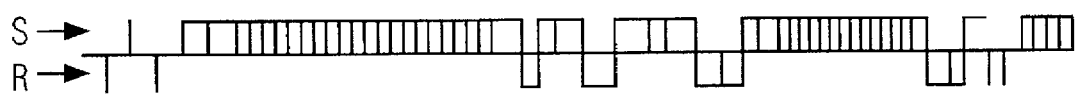
FIG. 5
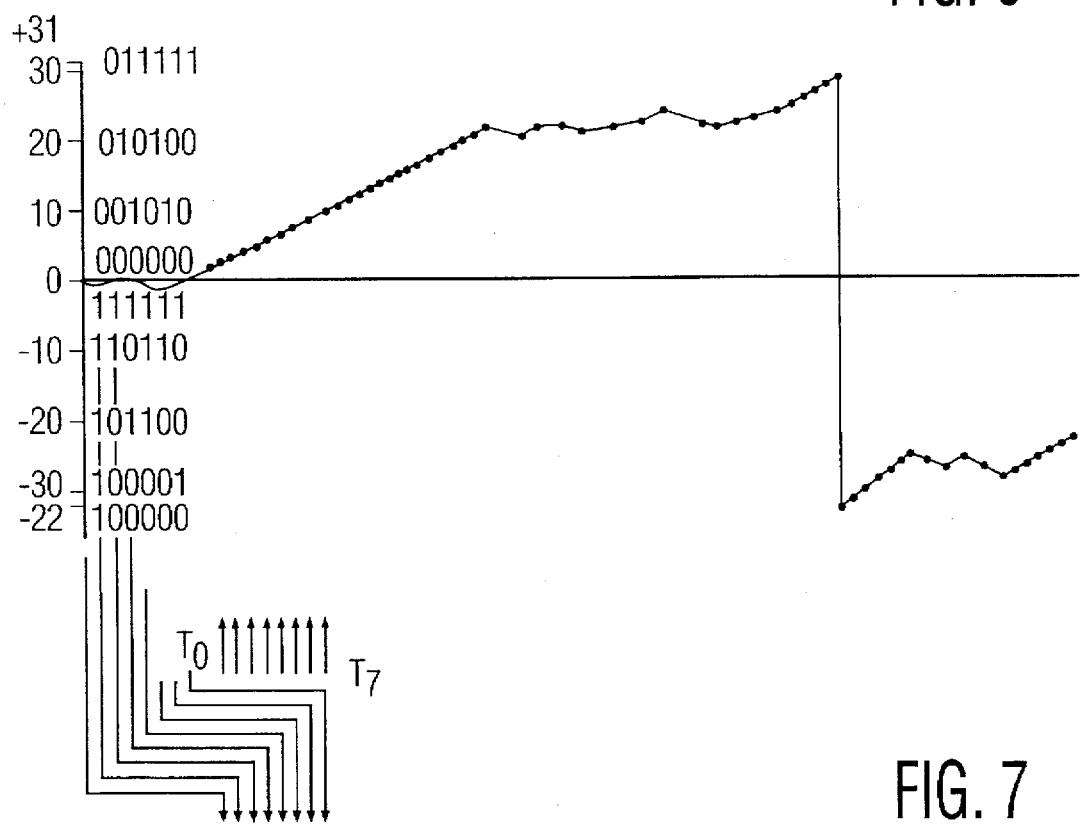
FIG. 6
FIG. 7
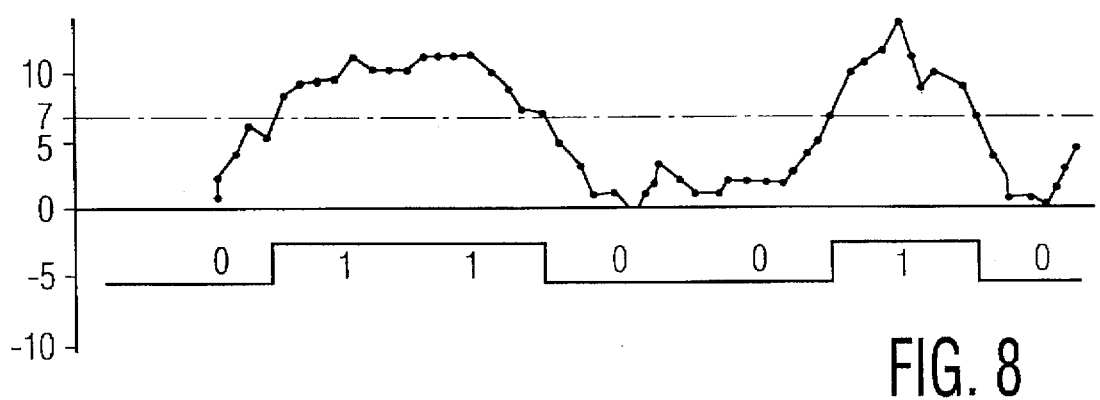
FIG. 8

RECEIVER HAVING AN ADJUSTABLE SYMBOL SLICE DEMODULATOR

BACKGROUND OF THE INVENTION

1. Field of the Invention

The present invention relates to a receiver having an adjustable symbol slice demodulator and particularly but not exclusively to a zero IF receiver for FSK signals. In such a receiver the output of the demodulator is supplied to a symbol slicer which in the case of 2 level modulation makes a decision if the symbol is say a binary 1 or binary 0 depending on whether the signal is above or below a slice threshold level.

2. Discussion of the Related Art

A problem with receivers in general is that the local oscillator frequency drifts with temperature and crystal aging which means that a time variable offset exists between the transmitter centre frequency and the receiver's local oscillator frequency. In order to try and cope with drifting, a receiver has a tolerance, expressed in Hertz, to be able to receive transmitted data whilst this offset exists. However, if the offset becomes too large the receiver will fail to receive the transmitted data. At higher frequencies such as in the UHF band (around 900 MHz), although the crystal aging and oscillator temperature drift expressed as parts per million (ppm) may be much the same as at lower frequencies, the actual drift expressed in Hertz is greater and as a result the tolerance of the receiver to receive data is exceeded so that extra measures are needed to ensure that the receiver continues to function under such conditions.

Normally receiver designers add automatic frequency control (AFC) to extend the offset performance of the receiver. Such AFC techniques frequently require the frequency offset to be measured and to use this to control the local oscillator frequency in such a way as to minimise the frequency offset. Using AFC is not without its disadvantages which include having to provide additional circuitry to control the local oscillator and making sure that the signal being received is the one whose offset you wish to measure. In systems where the transmitter is not permanently on, it is necessary to ensure that the control signal to the local oscillator does not respond to the channel noise and to ensure that the AFC control system does not respond to high level adjacent channel signals.

SUMMARY OF THE INVENTION

An object of the present invention is to counter the effects of large frequency offsets between a transmitter centre frequency and receiver local oscillator in a zero IF receiver.

According to the present invention there is provided an FSK receiver comprising means for producing pulse like representations proportional to the difference between the instantaneous frequency of the received signal and a local oscillator signal, means for using the pulse like representations for producing an instantaneous representation of frequency, means for measuring peak excursions of the instantaneous representations of the frequency, the difference between the peak excursions being proportional to the transmitted deviation, and means for calculating at least one symbol slice level from the difference between the peak deviations.

For a M-ary modulation scheme requiring (M-1) symbol slice levels, the means for calculating the plurality of symbol slice levels may comprise means for implementing an algorithm $$MIN + (MAX - MIN) \cdot \frac{2i-1}{2(M-1)} \bigg|_{i=1\ldots(M-1)}$$

where MIN is the minimum peak excursion, MAX is the maximum peak excursion and M is the number of modulation levels.

In the case of a 2 level signal, the means for calculating a symbol slice level using the algorithm simplifies to means for calculating the mean deviation of the peak excursions, which mean deviation is proportional to the offset between the transmitted centre frequency and the local oscillator frequency, and means for setting the slice level to the mean deviation.

The present invention also provides an FSK receiver comprising a zero IF stage including a local oscillator, demodulating means having means for producing pulse like representations of a received signal, the pulse like representations being proportional to the difference between the instantaneous frequency of the received signal and the local oscillator signal, means coupled to the demodulating means for counting the pulses, filtering means having a differential function coupled to said counting means for providing a demodulated representation of the signal, means for storing the maximum and minimum values of the demodulated representation of the signal, means for determining if the number of pulses received during successive periods of time corresponding substantially to a symbol period or part of a symbol period of a modulating signal exceeds a currently stored maximum or minimum value, means responsive to a change in at least one of the maximum and minimum values for calculating the mean value of the demodulated signal which is proportional to the frequency offset, means for determining the symbol slice level(s) from the maximum and minimum values and means for slicing the demodulated representation of the signal to produce the recovered data.

Adjustable symbol slice demodulation on its own has a number of advantageous features over integrator type closed loop control AFC systems. Adjustable bit slice demodulation does not require loop control with the associated risk of storing incorrect values. Furthermore it is fast acting and self correcting, both of which are of importance when dealing with high data rate signals. By comparison, closed loop AFC systems are affected adversely when no carrier is present, are slow to capture signals with respect to the signal data rate and the capture time varies with rf signal level and offset.

In an embodiment of the present invention the symbol slice threshold level is determined by calculating half of the sum of the maximum and minimum pulse counts for a 2 level modulation system.

BRIEF DESCRIPTION OF THE DRAWINGS

The present invention will now be described, by way of example, with reference to the accompanying drawings, wherein:

FIG. 5 shows a NRZ transmitted binary waveform, FIG. 6 shows the R and S pulses from the receiver of FIG. 1 representing the waveform shown in FIG. 5 when received with channel noise, FIG. 7 is a graph of the output of the up-down counter 54 of FIG. 3, FIG. 8 is a graph of the difference between the current count at the output of the up-down counter and the count one symbol period earlier, together with the recovered data.

In the drawings the same reference numerals have been used to indicate corresponding features.

DETAILED DESCRIPTION OF THE PREFERRED EMBODIMENTS

Referring to FIG. 1, diagram A represents a transmitted binary "0" and "1" as FSK signals relative to a transmitter central frequency $f_C$. Diagram B shows the receiver channel filter envelope RCF and illustrates the same signals with respect to a local oscillator frequency $f_L$ which corresponds to $f_C$. Here there is no frequency offset between $f_L$ and $f_C$. The sketch to the right of the frequency envelope relates to the pulse like representations of these binary signals produced by the circuit shown in FIG. 2. These pulse like representations are proportional to the difference between the instantaneous frequency of the received signal and the local oscillator frequency. In FIG. 1, the pulse representations of the binary "0" and "1" are identified as R and S, respectively. Diagrams C, D and E illustrate the effect of the local oscillator frequency $f_L$ drifting so that the offset between the transmitter centre frequency $f_C$ and the receiver local oscillator frequency $f_L$ increases from C to E to such an extent that binary "1" is no longer detectable as shown by the lack of "S" pulses in the right hand sketch of diagram E. Thus, if a fixed symbol slice circuit is connected to the output of the receiver of FIG. 2, the binary "1" would not be detected, resulting in the demodulated representation of the transmitted signal, that is the recovered data, to be incorrect. If AFC was applied, the local oscillator frequency could be pulled towards the transmitter centre frequency $f_C$. However, as explained in the preamble, there are some disadvantages to using AFC.

Figure 2:
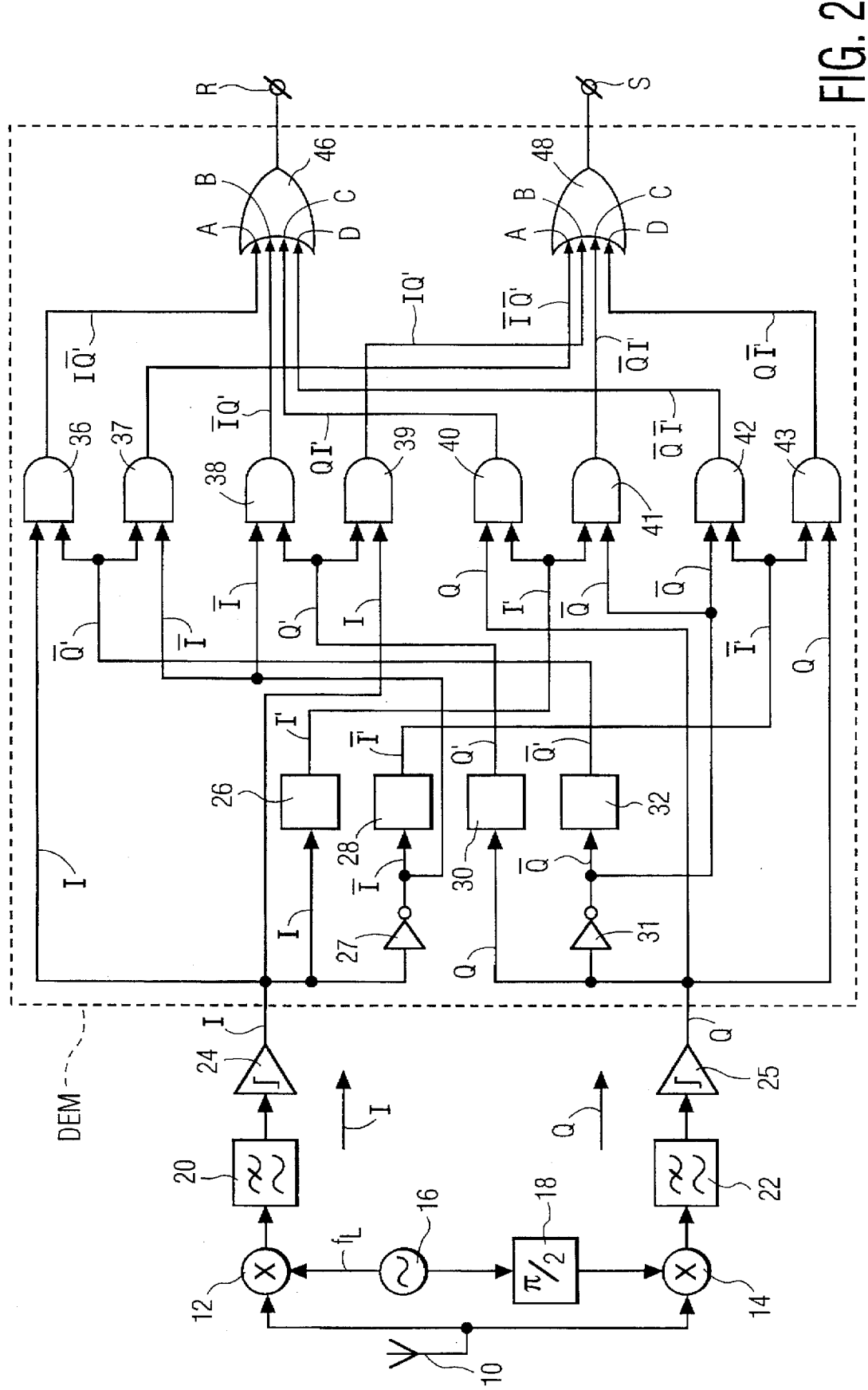
FIG. 2 is a block schematic diagram of a zero IF receiver of a type disclosed in European Patent Specification EP-A-0 405 679, FIG. 3 comprises waveform diagrams A to N relating to the operation of the circuit shown in FIG. 2.
Figure 3A:
Figure 3B:
Figure 3C:
Figure 3D:
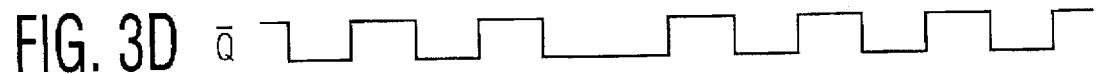
Figure 3E:
Figure 3F:
Figure 3G:
Figure 3H:
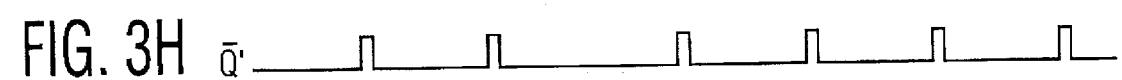
Figure 3I:
Figure 3J:
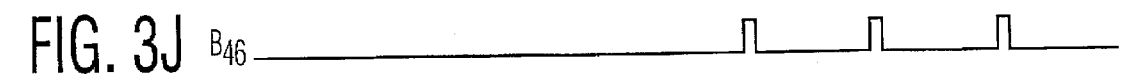
Figure 3K:
Figure 3L:
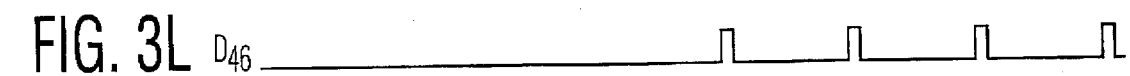
Figure 3M:
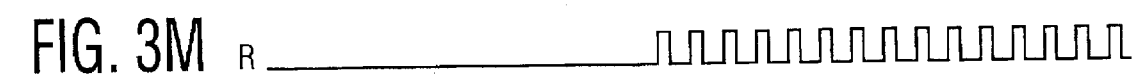
Figure 3N:

Referring to FIG. 2, the receiver comprises an antenna 10 for receiving FSK signals $f_C \pm \delta f$, where $f_C$ is a nominal carrier frequency and $\delta f$ is the deviation frequency for example 4.8 KHz for a data signal of 1200 bits/second. These signals are supplied to first inputs of first and second mixers 12, 14. A local oscillator 16 generating a frequency $f_L$, where ideally $f_C = f_L$, is connected to second inputs of the first and second mixers 12, 14. In the case of the mixer 14, a 90 degree phase shifter 18 is connected into the signal path between the local oscillator 16 and the mixer 14. The difference frequencies outputs of the first and second mixers are $f_L - (f_C + \delta f)$ when the input signal is $f_C + \delta f$, and $f_L - (f_C - \delta f)$ when the input is $f_C - \delta f$.

In a non-illustrated arrangement of the receiver's front end, the phase shifter 18 is inserted into one of the signal paths between the antenna 10 and the first or second mixer 12 or 14, and the local oscillator 16 is connected directly to the second inputs of the mixers 12, 14. In other non-illustrated arrangements of the receiver's front end, +45 degree and −45 degree phase shifters are arranged either in respective local oscillator paths or respective input signal paths.

The quadrature related difference signals are filtered in low pass filters 20, 22 and are then hard limited in respective limiting amplifiers 24, 25 which provide the I and Q square wave signals.

The I and Q signals are then applied to a demodulator DEM. Initially, pulse sequences I', $\bar{I}$', Q' and $\bar{Q}$' are derived from the amplitude limited I and Q square wave signals using monostable circuits 26,28,30,32 and inverters 27,31. The demodulator circuit comprises four pairs of two input AND gates 36,37; 38,39; 40,41 and 42,43. The I signal is applied to AND gates 36,39, the $\bar{I}$ signal to gates 37,38, the Q signal to the gates 40,43 and the $\bar{Q}$ signal to the gates 41,42.

The pulse sequences I',$\bar{I}$',Q' and $\bar{Q}$' are respectively applied to the AND gates 40,41; the gates 42,43; the gates 38,39 and the gates 36,37.

Two four-input OR gates 46,48 are provided. Inputs A to D of the OR gate 46 are connected respectively to the outputs of AND gates 36,38,40 and 42 and inputs A to D of the OR gate 48 are connected respectively to the outputs of AND gates 37,39,41 and 43. The OR gates 46,48 have outputs R and S respectively.

The operation of the circuit shown in FIG. 2 will now be described with reference to the waveforms shown in diagrams A to N of FIG. 3 which as a numeric example refers to an idealised 2 level NRZ signal having a symbol rate of 1200 bd (baud) and a deviation frequency of ±4.8 KHz which gives 4 cycles per symbol when there is no drift the local oscillator and nominal centre frequency. For ease of reference the diagrams A to N focus on a transition between a binary "1" and "0". Diagrams A to D show the I, $\bar{I}$, Q and $\bar{Q}$ amplitude limited non-return to zero (NRZ) square waves, respectively. Diagrams E to H are the pulse sequences occurring at the outputs of the monostable circuits 26,28, 30,32, respectively. It will be noted that the pulses in each sequence correspond to the positive going edge in the respective square wave signal and that the duration of each pulse is small compared to that of the associated square wave. In the pairs of AND gates the input square wave signals are sampled at a point in time phase shifted from their edges by substantially 90 degrees. Diagrams I to L, referenced $A_{46}$, $B_{46}$, $C_{46}$ and $D_{46}$, respectively show the inputs A to D of the OR gate 46. The inputs A to D of the OR gate 48 are not shown but can be deduced by examination of diagrams A to H. Diagrams M and N illustrate the outputs R,S of the NOR gates 46,48, respectively.

In the numeric example given above if there is an offset in the deviation frequency so that say a binary "1" is represented by 7.2 kHz, then there will be 6 cycles per symbol which results in 24 zero crossings per symbol and a binary "0" by 2.4 kHz, which is equivalent to 2 cycles per symbol results in 8 pulses per symbol. If a pulse is produced on each zero crossing and if these pulses are counted then one has a means for determining the frequency offset of the FSK signals.

Figure 1A:
FIG. 1 is a series of diagrams A to E illustrating the transmitted binary FSK signals (diagram A) and the effects of drift between the transmitter and receiver oscillators (diagrams B to E)
Figure 1B:
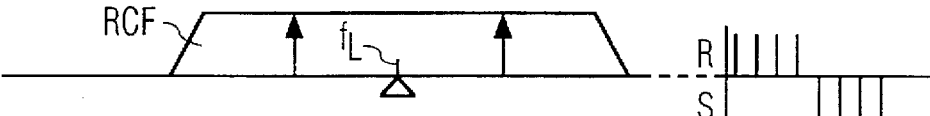
Figure 1C:
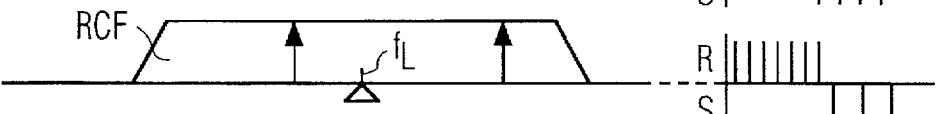
Figure 1D:
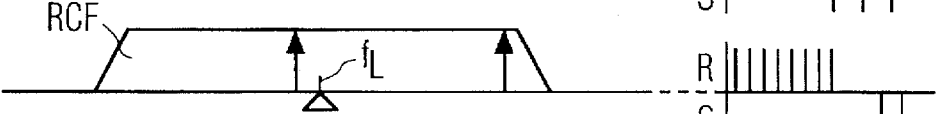
Figure 1E:
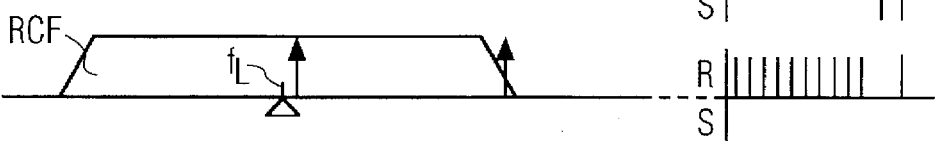
Figure 4:
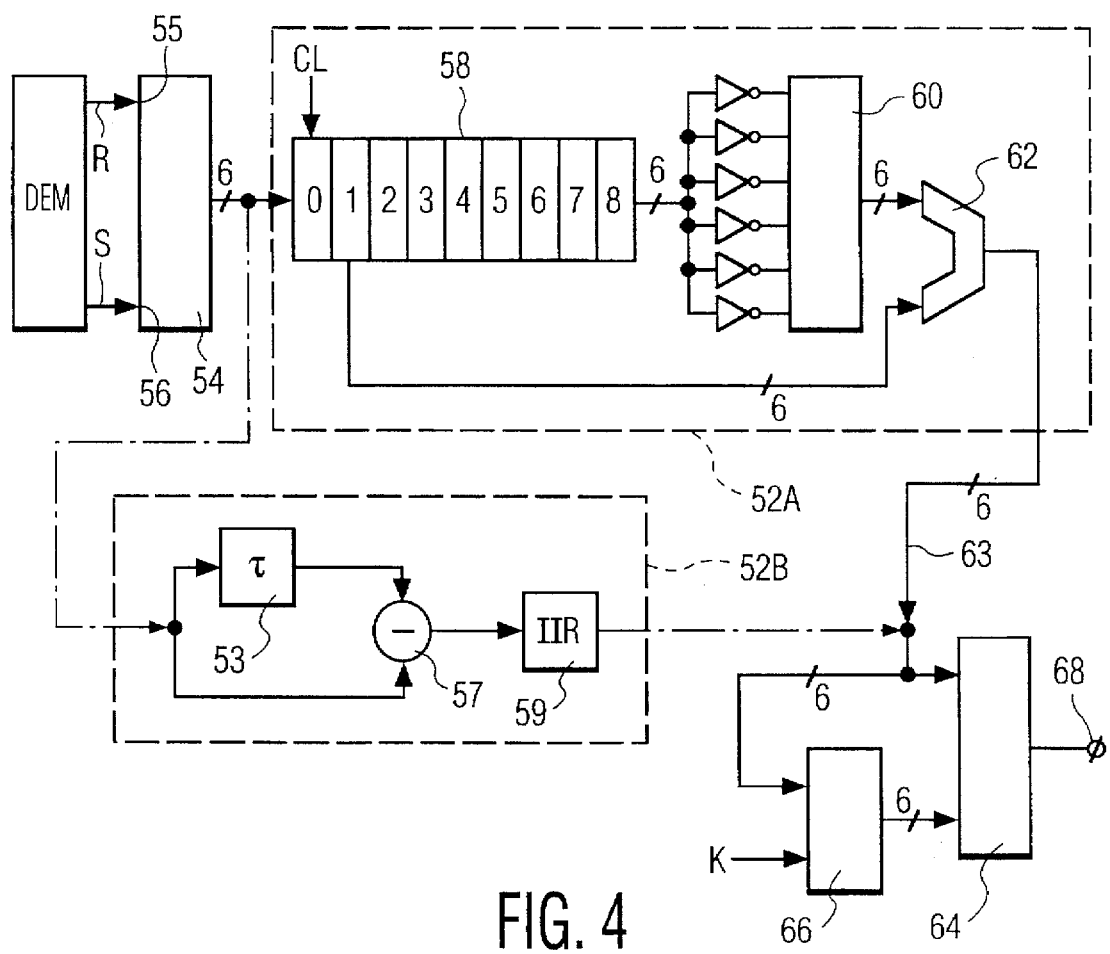
FIG. 4 is a block schematic diagram of two alternative embodiments of an adjustable symbol slicer.

The alternative embodiments of the adjustable symbol slicer shown in FIG. 4 are for use with 2-level demodulated signals. The embodiments differ in respect of the implementation of a filter 52A or 52B with a differentiate function. The output of the demodulator DEM is connected to an asynchronous up-down counter 54 having inputs 55,56 connected to receive the R and S outputs of the OR gates 46,48 in FIG. 2. The counter 54 has a 6-bit parallel output which is connected to a filter 52A which comprises a 9-stage shift register 58 which is clocked by a clock signal CL at 8 times the bit period of the signal received by the receiver (FIG. 2). In order to obtain the increment in the pulse count over the preceding symbol period the difference between the output and input of the shift register 58 is obtained. One method of doing this is to apply the parallel output of the shift register 58 to a 2s complement circuit 60. The parallel output of the circuit 60 is applied together with the parallel output of the first stage of the shift register 58 to a summation circuit 62. The difference between the two counts is applied by way of a parallel bus 63 to a one bit comparator 64 which also receives the current representation of the slice level from a stage 66 (described with reference to FIG. 12). The values on the respective inputs are compared and a 2-level data output is produced on terminal 68.

In the alternative embodiment of the filter 52B, the output from the counter 54 is applied to 1 bit delay stage 53 and to one input of a subtracting stage 57, the second input being coupled to an output of the delay stage 53. The combination of the stages 53, 57 provides a 1 bit differentiation. An output of the stage 57 is coupled to an IIR (Infinite Impulse Response) filter 59. An output of the filter 59 is coupled to respective inputs of the one bit comparator 64 and the stage 66.

In an alternative non-illustrated embodiments the increment in the pulse count for part of a preceding symbol period is derived by either having a smaller shift register or clocking the shift register 58 at a higher rate.

The principle of the operation of the adjustable symbol slicer will now be described with reference to FIGS. 5 to 8. FIG. 5 shows a NRZ binary waveform representing a transmitted sequence of binary values 0110010. FIG. 6 shows the R and S signals when the transmitted sequence is received, in the presence of noise. The rf signal level is assumed close to the received threshold. Also, there is a relatively large frequency offset between the receiver local oscillator frequency $f_L$ and the transmitter centre frequency $f_C$, see diagram D of FIG. 1.

The counter 54 is a 6 bit counter in which negative counts comprise the 2's complement of the corresponding positive counts. When the counter 54, while counting up, reaches its maximum it resets itself as illustrated in FIG. 7 and continues counting. Likewise if the counter is counting down and reaches its minimum, it resets itself and continues counting from the top downwards. In the case of the filter 52A (FIG. 4), in order to determine the amount by which the count in the counter 54 has changed in a symbol period, the shift register 58, 2s complement stage 60 and the summation circuit 62 collectively form a sliding window by subtracting the newest count from the longest held count, corresponding to one symbol period earlier. As the shift register 58 is clocked at eight times the clock rate, then in each symbol period there will be 8 difference counts. The difference counts are indicated by dots on the upper curve in FIG. 8. As, in this example there is a substantial offset between the local oscillator and transmitter frequencies, the curve does not go below zero. In FIG. 8 by arranging the symbol slice level from the stage 66 (FIG. 4) to have a value of 7, then the data output is a delayed version of the input data shown in FIG. 5. The symbol slice level for 2 levels is determined by ascertaining the maximum and minimum values of difference counts, and taking the mean of them. In FIG. 8 the maximum and minimum values are 14 and 0 respectively and, the mean is 7 which gives a symbol slice level of 7. It will be noted in the lower diagram of FIG. 8 that decisions made by the symbol slicer form a time delayed version of the NRZ binary waveform shown in FIG. 5.

Figure 9:
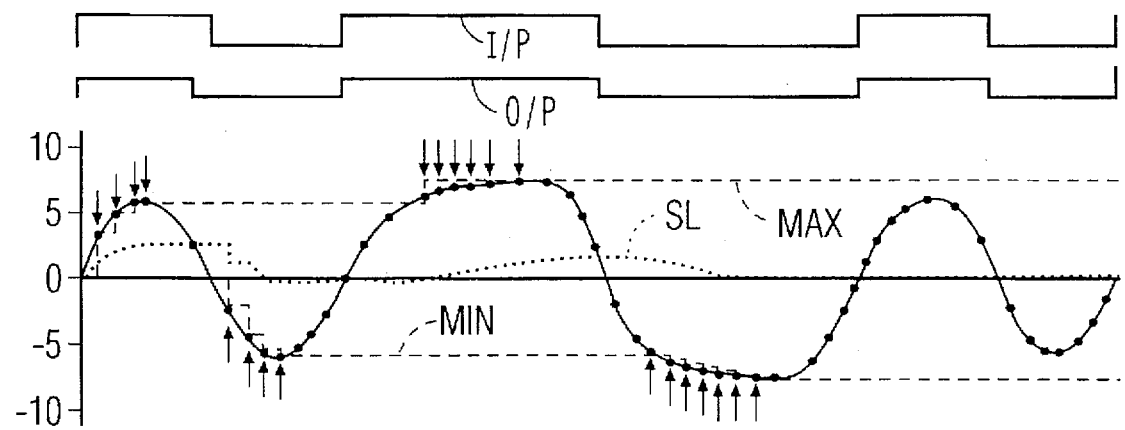
FIGS. 9 to 11 are graphs illustrating how a variable symbol slice level(s) are obtained for different shifts in the offset frequencies, the input and recovered data being shown above each graph for 2 levels.
Figure 10:
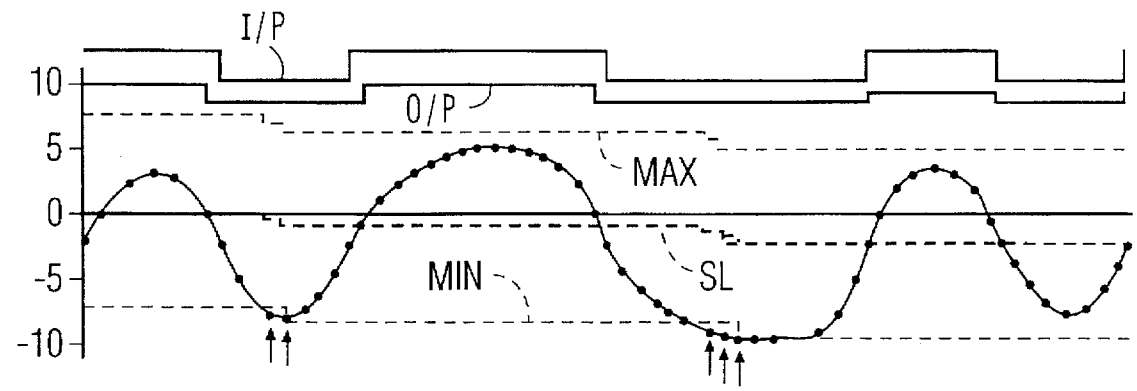
Figure 11:
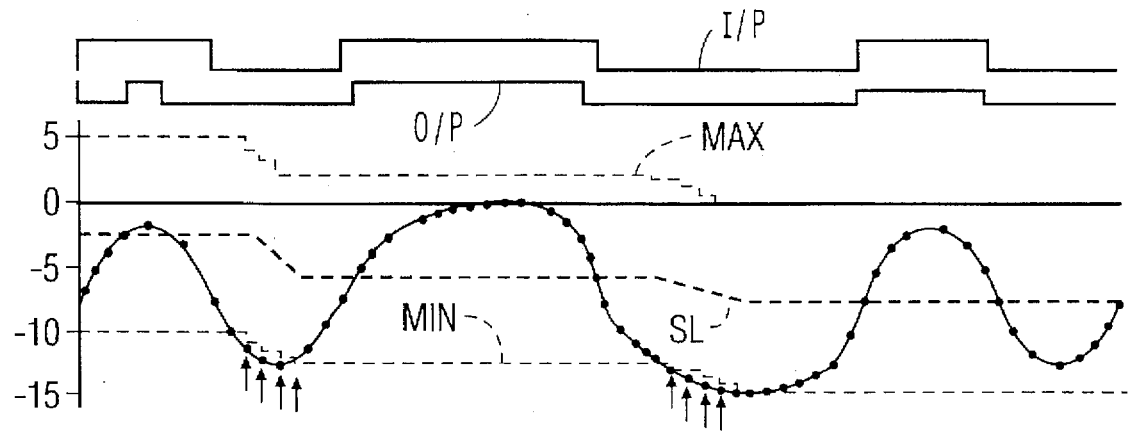

FIGS. 9 to 11 are graphs illustrating examples of adjusting the symbol slice levels for differences in shift of the local oscillator frequency. Each figure comprises three diagrams representing the input data i/p at the transmitter, the output data o/p at the receiver and the changes in the maximum (MAX) and the minimum (MIN) values and the symbol slice level (SL). In these Figures the arrow heads pointing downwards indicate an update in the maximum value and the arrow heads pointing upwards indicate an update in the minimum value. As more data is received, the values of maximum, MAX, and minimum, MIN, and the symbol slice level, SL, tend to stabilise with the result that the input and output waveforms resemble each other. A simple algorithm for updating the maximum and minimum values for a 2 level signal is:

---

Constant, K = 2 x 4 x deviation/bit rate
At start-up MAX = 0, MIN = 0
The program loop is as follows:
*If VALUE > MAX, then MAX = VALUE
If VALUE < MIN, then MIN = VALUE
Symbol slice level = (MAX + MIN)/2
If MAX – MIN > K, then
    MAX = MAX – 1
    MIN = MIN + 1
Return to *

---

Figure 12:
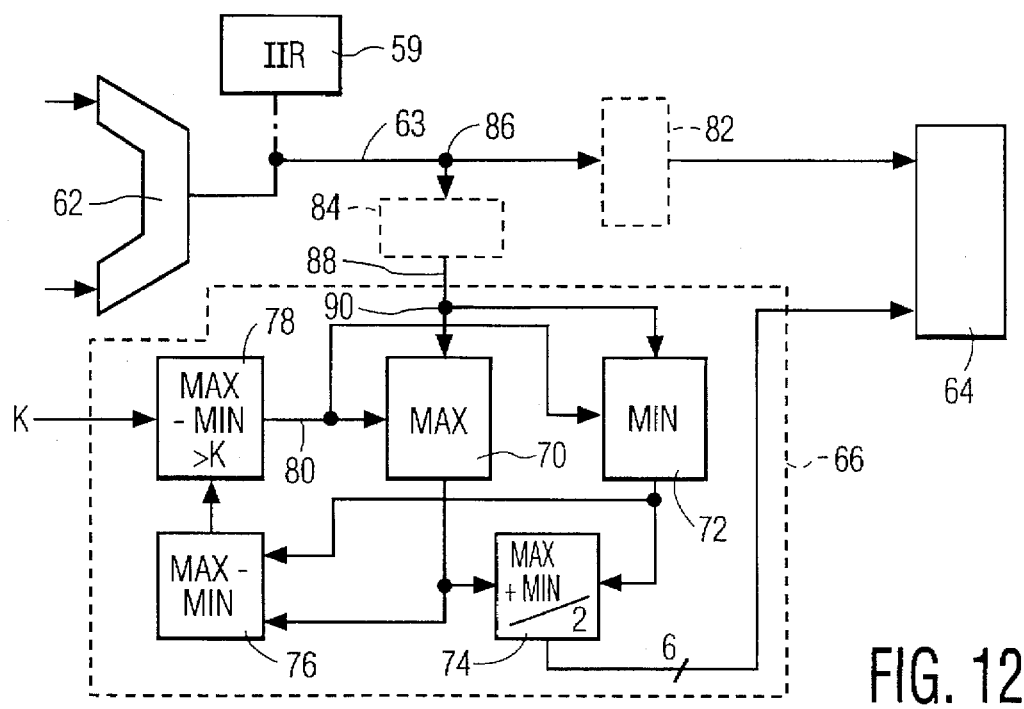
FIG. 12 is a block schematic diagram of an implementation of an algorithm for updating maximum and minimum values for 2 levels and producing a symbol slice level.

FIG. 12 illustrates in full lines a hardware implementation of the algorithm for updating the maximum and minimum values. The output of the summation circuit 62 or the IIR59 (FIG. 4) is applied by a bus 63 to a maximum (MAX) value register 70 and to a minimum (MIN) value register 72, each of which stores the current MAX and MIN value. The current symbol slice level SL is derived by obtaining the mean of the sum of the MAX and MIN values in stage 74 and applying it to the comparator 64 (FIG. 4).

The difference between the current MAX and MIN values is derived in a stage 76 and its output is applied to a comparator stage 78 together with the value of K. If MAX-MIN is greater than K, then an output having a value of "1" is provided on a line 80 coupled to the registers 70,72. In the case of the register 70, the unity value is subtracted from the current value of MAX to give a new MAX, that is the new MAX=(current) MAX−1. With the register 72, the unity value is added to the current value of MIN to give a new MIN, that is the new MIN=(current) MIN+1.

FIG. 12 also shows in broken lines a refinement to the basic hardware implementation of the algorithm for updating the maximum and minimum values. The refinement comprises the provision of filters 82, 84 in the bus 63 after a junction 86 from which an input to the stage 66 is derived and in bus 88 between the junction 86 and a junction 90 to which the inputs and in bus 88 between the junction 86 and a junction 90 to which the inputs of the maximum and minimum value registers 70, 72 are connected. The filters 82 and 84 are digitally implemented filters. In the case of the filter 82 it is designed to pass data signals to the one bit comparator 64. The filter 84 is a slow tracking filter whose primary function is to block any fast transients from entering the registers 70, 72 and upsetting the slice level output of the stage 74 and hence causing the comparator 64 to detect a symbol incorrectly. The cut off frequency of the filter 84 is at or slightly higher than the highest frequency of the data, which cut-off frequency will be greater for values of M greater than 2.

Up to now consideration has been given to 2-level modulation such as is found in the CCIR Radiopaging Code No. 1 otherwise known as POCSAG. However the teachings of the present invention can be applied to M - ary modulation schemes. As an example consider M=4. A 4 level modulation scheme is used in the ERMES paging code produced by ETSI (European Telecommunications Standards Institute) and the various symbols are indicated by the following frequency deviations relative to a notional centre frequency.

| SYMBOL | DEVIATION | BAUD RATE | NUMBER OF ZERO CROSSINGS PER BIT |
|---|---|---|---|
| 10 | +4.6875 kHz | 3.125 kBd | 6 |
| 11 | +1.5625 kHz | 3.125 kBd | 2 |
| 01 | −1.5625 kHz | 3.125 kBd | −2 |
| 00 | −4.6875 kHz | 3.125 kBd | −6 |

For M=4, three slice levels SL1,SL2 and SL3 (FIG. 15) are required to distinguish between the 4 symbols. A general algorithm for calculating slice levels from the maximum (MAX) and minimum (MIN) levels is:

$$MIN + (MAX - MIN) \cdot \frac{2i-1}{2(M-1)} \Big|_{i=1\ldots(M-1)}$$

where M is the number of levels.

Thus for M=4, there are 3 slice levels i=1,2,3 given by:

$$MIN + (MAX - MIN) \cdot \left(\frac{1}{6}, \frac{3}{6}, \frac{5}{6}\right)$$

| RECEIVED SYMBOL VALUE ON OUTPUT OF CIRCUIT 62 | OUTPUT SLICED SYMBOL VALUE ON TERMINAL 68 |
|---|---|
| <MIN + (MAX − MIN) · 1/6 | 00 |
| <MIN + (MAX − MIN) · 3/6 | 01 |
| <MIN + (MAX − MIN) · 5/6 | 11 |
| >MIN + (MAX − MIN) · 5/6 | 10 |

Figure 13:
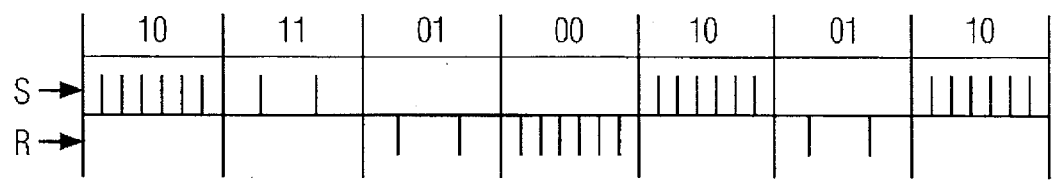
FIG. 13 shows the R and S outputs for a 4 level modulated signal.

FIG. 13 illustrates the R and S outputs (FIG. 2) relating to a 4 level signal and assumes that there is no frequency deviation between the transmitter centre frequency $f_C$ and the receiver local oscillator frequency $f_L$ and that there is no noise on the received signal.

Figure 14:
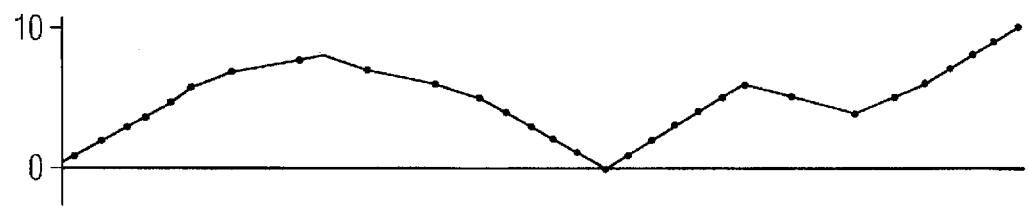
FIG. 14 shows the instantaneous value of the counter when the R and S pulses of FIG. 13 are applied.

FIG. 14 is a graph of the counts in the counter 54 (FIG. 4).

Figure 15:
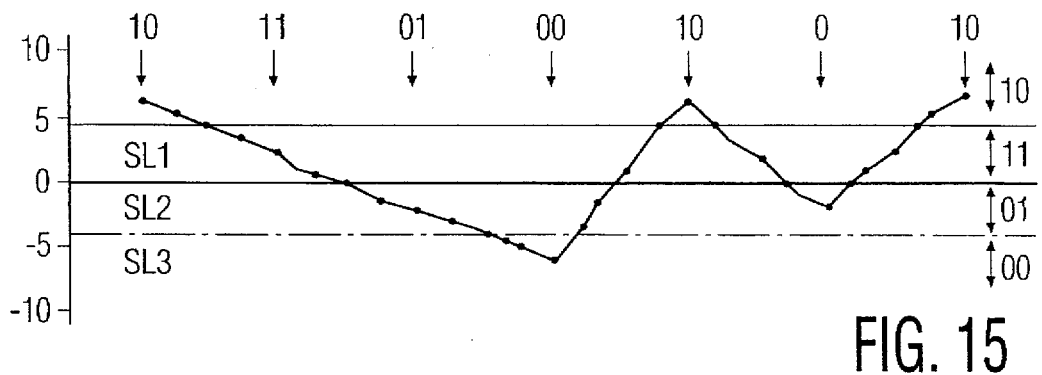
FIG. 15 is a graph showing the difference between the instantaneous counter output and the output one symbol period earlier together with three slice levels.

FIG. 15 is a graph of the difference counts showing the slice levels SL1,SL2,SL3. It will be noted that by making decisions at the zero crossings of the data signal, the original data values are recovered.

From reading the present disclosure, other modifications will be apparent to persons skilled in the art. Such modifications may involve other features which are already known in the design, manufacture and use of zero IF receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An FSK receiver comprising:

means for producing pulse like representations proportional to a difference between an instantaneous frequency of a received signal and a local oscillator signal, said means being responsive to a demodulated quadrature representation of the received signal, the demodulated quadrature representation of the received signal being developed as a function of the local oscillator signal;

means for using the pulse like representations for producing instantaneous representations of frequency of the received signal;

means for measuring peak excursions of the instantaneous representations of the frequency, wherein a difference between the peak excursions is proportional to a transmitted deviation frequency; and means for calculating at least one symbol slice level from a difference between peak deviations.

2. The receiver as claimed in claim 1, wherein said means for calculating at least one symbol slice level comprises a means for implementing an algorithm $$MIN + (MAX - MIN) \cdot \frac{2i-1}{2(M-1)} \Big|_{i=1\ldots(M-1)}$$

where MIN is a minimum peak excursion, MAX is a maximum peak excursion and M is a number of modulation levels.

3. An FSK receiver comprising:

means for producing pulse like representations proportional to a difference between an instantaneous frequency of a received signal and a local oscillator signal;

means for using the pulse like representations for producing instantaneous representations of frequency of the received signal;

means for measuring peak excursions of the instantaneous representations of the frequency, wherein a difference between the peak excursions is proportional to a transmitted deviation frequency; and means for calculating at least one symbol slice level from a difference between peak deviations which comprises means for calculating a mean deviation of the peak excursions, wherein the mean deviation is proportional to an offset between a transmitted centre frequency and a local oscillator frequency, and means for setting the symbol slice level to the mean deviation.

4. The receiver as claimed in claim 3, said demodulator means includes an adjustable symbol slicer comprising an asynchronous up/down counter means having an incrementing input and a decrementing input coupled to receive a first and a second series of output pulses, filtering means having a differentiating function, and means synchronised with the symbol periods for determining recovered data as a discrete differentiation of an integrated pulse count.

5. The receiver as claimed in claim 4, further comprising first and second means for storing maximum and minimum counts, respectively, means for replacing a maximum or minimum value stored if a count exceeds, in a relevant direction, a currently stored maximum or minimum count and means coupled to said first and second storing means for determining the symbol slice threshold level on a basis of an algorithm:

$$MIN + (MAX - MIN) \cdot \frac{2i-1}{2(M-1)} \bigg|_{i=1...(M-1)}$$

where MIN is a minimum peak excursion, MAX is a maximum peak excursion and M is a number of modulation levels.

6. The receiver as claimed in claim 4, further comprising first and second means for storing maximum and minimum counts, respectively, means for replacing a maximum or minimum value stored if a count exceeds, in a relevant direction, a currently stored maximum or minimum count and means coupled to said first and second storing means for determining the symbol slice threshold level on a basis of half of a sum of the currently stored maximum and minimum counts.

7. An FSK receiver comprising:
means for producing pulse like representations proportional to a difference between an instantaneous frequency of a received signal and a local oscillator signal;
means for using the pulse like representations for producing instantaneous representations of frequency;
means for measuring peak excursions of the instantaneous representations of the frequency, wherein a difference between the peak excursions is proportional to a transmitted deviation deviation frequency;
means for calculating at least one symbol slice level from a difference between peak deviations; and
transient blocking means for blocking fast transients, said transient blocking means being coupled to said means for calculating at least one symbol slice level.

8. An FSK receiver, comprising:
a zero IF stage including a local oscillator,
demodulating means having means for producing pulse like representations of a received signal, the pulse like representations being proportional to a difference between an instantaneous frequency of a received signal and a local oscillator signal the means for generating being responsive to a demodulated quadrature representation of the received signal which is developed as a function of the local oscillator signal,
means coupled to said demodulating means for counting the pulses,
filtering means having a differential function coupled to said counting means for providing a demodulated representation of the signal,
means for storing maximum and minimum values of the demodulated representation of the signal, means for determining if a number of pulses received during successive periods of time corresponding substantially to a symbol period or part of a symbol period of a modulating signal exceeds a currently stored maximum or minimum value,
means responsive to a change in at least one of the maximum and minimum values for calculating a mean value of the demodulated signal which is proportional to the frequency offset,
means for determining a symbol slice level from the maximum and minimum values and means for slicing the demodulated representation of the signal to produce the recovered data.

9. An FSK receiver, comprising:
a zero IF stage including a local oscillator,
demodulating means having means for producing pulse like representations of a received signal, the pulse like representations being proportional to a difference between an instantaneous frequency of a received signal and a local oscillator signal,
means coupled to said demodulating means for counting the pulses,
filtering means having a differential function coupled to said counting means for providing a demodulated representation of the signal,
means for storing maximum and minimum values of the demodulated representation of the signal,
means for determining if a number of pulses received during successive periods of time corresponding substantially to a symbol period or part of a symbol period of a modulating signal exceeds a currently stored maximum or minimum value,
means responsive to a change in at least one of the maximum and minimum values for calculating a mean value of the demodulated signal which is proportional to the frequency offset, means for determining a symbol slice level from the maximum and minimum values and means for slicing the demodulated representation of the signal to produce the recovered data wherein said zero IF stage further comprises:
means for producing quadrature related first and second signals, wherein said means for producing pulse like representations proportional to the difference between the instantaneous frequency of the received signal and the local oscillator signal comprises means for providing inverted versions of the first and second signals as third and fourth signals, respectively,
means for generating a pulse at an occurrence of a predetermined edge of the first, second, third and fourth signals, and
means for producing a first series of output pulses when the first signal leads the second signal in phase and a second series of output pulses when the second signal leads the first signal in phase.

10. The receiver as claimed in claim 9, further comprising an adjustable symbol slicer comprising an asynchronous up/down counter means having an incrementing input and a decrementing input coupled to receive the first and second series of output pulses, wherein the filter includes means for providing a sliding window for observing output counts of the counter separated by a predetermined time period and means synchronised with the symbol periods for determining the recovered data as the discrete differentiation of the integrated pulse count.

11. An FSK receiver, comprising:
means for producing pulse like representations proportional to a difference between an instantaneous frequency of a carrier modulated received signal and a local oscillator signal in response to a carrier demodulated representation of the received signal;
means for using the pulse like representations for producing instantaneous representations of frequency of the received signal;
means for measuring peak excursions of the instantaneous representations of the frequency, wherein a difference between the peak excursions is proportional to a transmitted deviation frequency; and means for calculating at least one symbol slice level from a difference between peak deviations.

12. The receiver as claimed in claim 11, wherein said means for producing pulse like representations includes a monostable circuit which controls the width of the pulse like representations.

13. The receiver as claimed in claim 1, wherein said means for producing pulse like representations includes a monostable circuit which controls the width of the pulse like representations.

14. A method for use in an FSK receiver, comprising the steps of:

producing pulse like representations proportional to a difference between an instantaneous frequency of a received signal and a local oscillator signal which is responsive to a demodulated quadrature representation of the received signal, the demodulated quadrature representation of the received signal being developed as a function of the local oscillator signal;

developing, using the pulse like representations, instantaneous representations of frequency of the received signal;

measuring peak excursions of the instantaneous representations of the frequency, wherein a difference between the peak excursions is proportional to a transmitted deviation frequency; and calculating at least one symbol slice level from a difference between peak deviations.

15. A method for use in an FSK receiver, comprising the steps of:

producing pulse like representations proportional to a difference between an instantaneous frequency of a carrier modulated received signal and a local oscillator signal in response to a carrier demodulated representation of the received signal;

developing, using the pulse like representations, instantaneous representations of frequency of the received signal;

measuring peak excursions of the instantaneous representations of the frequency, wherein a difference between the peak excursions is proportional to a transmitted deviation frequency; and means for calculating at least one symbol slice level from a difference between peak deviations.

* * * * *